United States Patent
Asplund

(10) Patent No.: US 8,875,857 B2
(45) Date of Patent: Nov. 4, 2014

(54) SYSTEM ADAPTED FOR ONE OR MORE ELECTRICALLY PROPELLABLE VEHICLES (A SNOW PLOUGH ARRANGEMENT)

(75) Inventor: Gunnar Asplund, Solna (SE)

(73) Assignee: Elways AB, Solna (SE)

( * ) Notice: Subject to any disclaimer, the term of this patent is extended or adjusted under 35 U.S.C. 154(b) by 86 days.

(21) Appl. No.: 13/638,547

(22) PCT Filed: Mar. 31, 2011

(86) PCT No.: PCT/SE2011/050382
§ 371 (c)(1),
(2), (4) Date: Sep. 28, 2012

(87) PCT Pub. No.: WO2011/123051
PCT Pub. Date: Oct. 6, 2011

(65) Prior Publication Data
US 2013/0025168 A1    Jan. 31, 2013

(30) Foreign Application Priority Data
Apr. 1, 2010  (SE) .................................... 1000328

(51) Int. Cl.
*B60M 1/30*  (2006.01)
(Continued)

(52) U.S. Cl.
CPC . *B60M 1/36* (2013.01); *B60M 1/34* (2013.01); *Y02T 10/648* (2013.01);
(Continued)

(58) Field of Classification Search
CPC ............... B60L 5/36; B60L 5/40; B60L 5/42; B60L 11/1809; B60L 2200/26; B60M 1/36; B60M 1/08; B60M 1/34; B60M 7/003; Y02T 10/70; Y02T 10/648; Y02T 10/646; Y02T 10/7005; Y02T 10/7088; Y02T 90/14
USPC .......... 191/2, 3, 14, 22 R–25, 22 C; 104/139, 104/140, 142, 146
See application file for complete search history.

(56) References Cited

U.S. PATENT DOCUMENTS 3,637,956 A * 1/1972 Blackman .......................... 191/4
3,914,562 A * 10/1975 Bolger ............................. 191/10
(Continued)

FOREIGN PATENT DOCUMENTS

DE         72443 C    6/1893
EP        0151982 A2  8/1985
(Continued)

OTHER PUBLICATIONS

International Search Report issued on Jun. 22, 2011 by the SE International Searching Authority in International Application No. PCT/SE2011/050382.

(Continued)

*Primary Examiner* — Jason C Smith
(74) *Attorney, Agent, or Firm* — Raymond R. Ferrera; Adams and Reese LLP

(57) ABSTRACT

A snow plough arrangement comprising a least one snow plough unit and related to a system for driving an electrically propellable vehicle along a roadway. The vehicle has three sources of power: a vehicle-related power generator, a set of batteries and vehicle-external electric stations. The vehicle is provided with a current collector which is displaceable up and down and sideways in relation to the direction of transportation, in order to be brought into mechanical and electrical contact with elongated tracks positioned below the roadway and comprising a conductor adapted to be connected with an electric station. The snow plough unit is rotatably fastened to the contact means in an upper area thereof about a horizontally oriented axis of rotation and adapted to clear loose obstacles from the track and yield to solid obstacles. The snow plough unit and the axis of rotation are movably disposed in a vertical direction by means of a resilient member. The snow plough unit comprises a forwardly directed edge portion oriented in the direction of travel, the edge portion comprising a point, which may be brought into contact with the bottom of the track and/or the conductor.

14 Claims, 4 Drawing Sheets

Figure 1A:
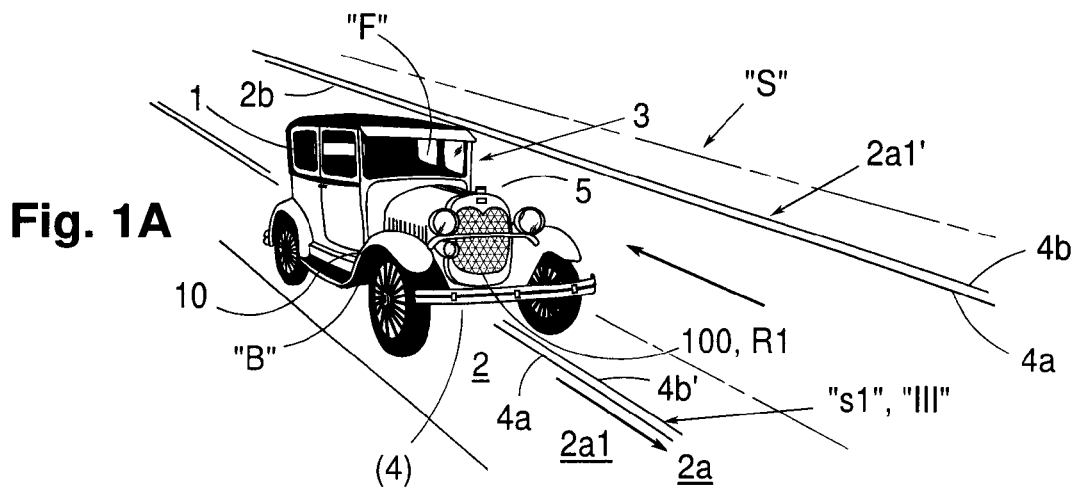

(51) Int. Cl.
*B60M 1/34* (2006.01)
*E01H 8/12* (2006.01)
*B60L 11/18* (2006.01)
*B60M 1/36* (2006.01)
*B60L 5/40* (2006.01)
*H01R 41/02* (2006.01)

(52) U.S. Cl.
CPC ............. *E01H 8/12* (2013.01); *B60L 11/1801* (2013.01); *Y02T 10/70* (2013.01); *B60L 2200/26* (2013.01); *H01R 41/02* (2013.01); *Y02T 10/7005* (2013.01); *B60L 5/40* (2013.01)
USPC .......................................... 191/22 C; 191/10

(56) References Cited

U.S. PATENT DOCUMENTS

| | | | | |
|---|---|---|---|---|
| 4,007,817 | A * | 2/1977 | Bolger, Jr. | 191/10 |
| 4,129,203 | A * | 12/1978 | Berman | 191/48 |
| 4,139,071 | A * | 2/1979 | Tackett | 180/165 |
| 4,476,947 | A * | 10/1984 | Rynbrandt | 180/2.1 |
| 5,464,082 | A * | 11/1995 | Young | 191/2 |
| 5,960,717 | A * | 10/1999 | Andre | 104/139 |
| 6,240,852 | B1 * | 6/2001 | Camp | 104/140 |
| 8,365,888 | B2 * | 2/2013 | Re Fiorentin et al. | 191/13 |
| 2007/0278059 | A1 * | 12/2007 | Afriat | 191/29 R |
| 2011/0106349 | A1 * | 5/2011 | Sakita | 701/22 |
| 2011/0153184 | A1 * | 6/2011 | Suh | 701/117 |
| 2011/0266108 | A1 * | 11/2011 | Kitaguchi | 191/22 C |
| 2012/0067684 | A1 * | 3/2012 | Asplund | 191/22 C |
| 2013/0025168 | A1 * | 1/2013 | Asplund | 37/207 |
| 2013/0025990 | A1 * | 1/2013 | Asplund | 191/22 C |
| 2013/0025991 | A1 * | 1/2013 | Asplund | 191/22 C |
| 2013/0025992 | A1 * | 1/2013 | Asplund | 191/22 C |
| 2013/0037367 | A1 * | 2/2013 | Aguilar | 191/22 C |

FOREIGN PATENT DOCUMENTS

| | | |
|---|---|---|
| EP | 0505845 A1 | 9/1992 |
| FR | 975255 A | 3/1951 |
| WO | 03104016 A1 | 12/2003 |

OTHER PUBLICATIONS

Written Opinion of the International Searching Authority issued on Jun. 22, 2011 by the SE International Searching Authority in International Application No. PCT/SE2011/050382.

* cited by examiner

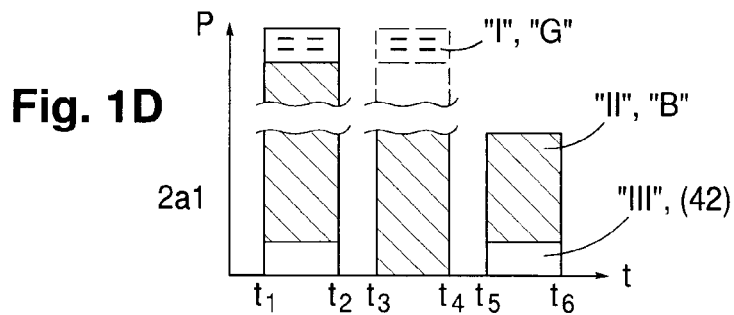
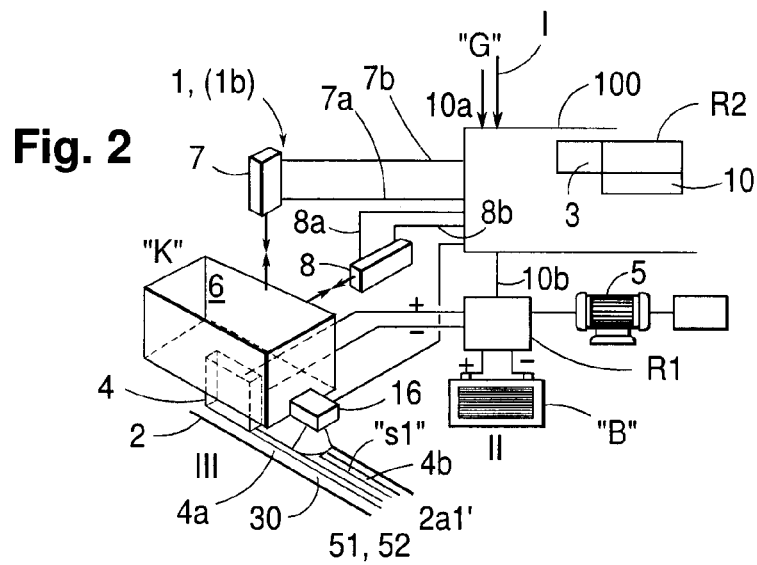
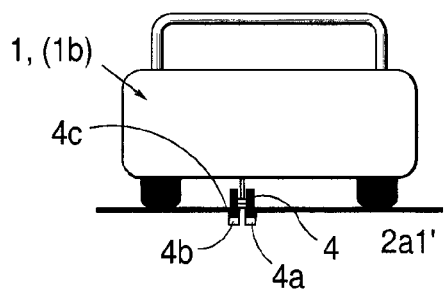
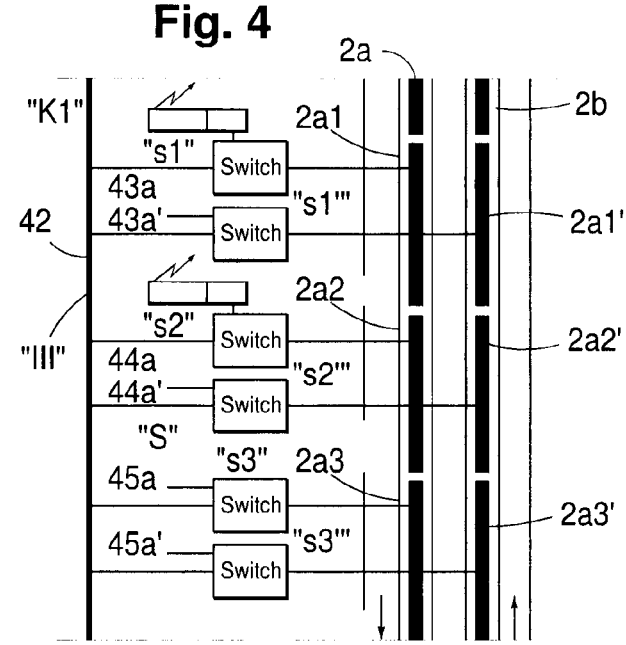

SYSTEM ADAPTED FOR ONE OR MORE ELECTRICALLY PROPELLABLE VEHICLES (A SNOW PLOUGH ARRANGEMENT)

TECHNICAL FIELD OF THE INVENTION

This invention refers generally to a snow plough arrangement, said arrangement being related to vehicles, specifically to such arrangement which is adapted to be able to elevate and lower contact means and/or a contact device, with each vehicle being adapted to a system appropriate for electrically propellable vehicles and more particularly to such system in which i.a. one or more batteries and/or a set of batteries for power adaptation and energy storage are intended for being able to propel the vehicle rolling along a stretch of a roadway.

Such a plough arrangement has as its purpose to cleanse a track or a groove from snow and ice.

Systems of this type are based on utilizing a specifically designed stretch of the road or roadway wherein the upper surface of this stretch of the roadway exhibits at least one track in the form of groove and in which track one, two or more parallel electric conductors or strips with a conductor surface which may be placed under power or voltage are disposed and which preferably are provided with uncovered and uninsulated contact surface sections.

In accordance with the instructions of the present invention such system is to comprise; "a" a plurality of roadway sections or portions subdividing the total stretch of the roadway and each allotted to one or more electrically conductive surfaces, such as conductors or strips, said roadway portions being connectable over a switch to one or more stationary electric stations serving as a source of power or energy, external to vehicles so as thereof i.a. to charge batteries belonging to vehicles and/or sets of batteries intended primarily to propel the vehicle by means of said set of batteries along the stretch of the roadway and its roadway sections or portions and "b" one or more, over an individual electric motor or a plurality of motors, propellable vehicles, wherein each of said vehicles is to exhibit a control circuit controlling the power so as to create a chosen and required propelling effect and/or a speed adaptation and/or control.

The invention is to be applied to stretches of roadways in the form of public and private roads and along their road sections or portions but can also find use in industrial systems having different requirements of power and energy.

The invention has the purpose i.a. of concurrently with power charging of the set of batteries from the external source of energy, supplying the power and the energy which will be required for a chosen power requirement for driving the vehicle upwards and over an upwardly rising portion of the roadway.

More particularly the present invention refers to such system in which a non-railbound vehicle, such as a freight vehicle, while being driven along chosen roadway sections or portions by means of its set of batteries allotted to the vehicle, can be supplied with supplementary power and energy, such as from the external source of power or alternatively from a source of power related to the vehicle, such as a diesel generator.

In this regard the present invention proposes a "first" source of power related to the vehicle, such as a diesel generator, a "second" source of power related to the vehicle, such as a battery set, and a "third" source of power separated from the vehicle and being disposed externally, such as two or more conductor surfaces, such as conductors or strips which may be placed under power and be included in tracks or grooves in successive roadway sections or portions, with the conductors of a chosen roadway section being electrically insulated from corresponding conductors in an adjacent (preceding or succeeding) roadway section or portion.

The present invention is based on having two or more conductors built into one track or into individual tracks or grooves in their respective roadway sections or portions, with said tracks (not the conductors) extending continually from roadway section or portion to roadway section or portion.

The voltage which is allotted to these conductors can be an alternating voltage (AC power) (with a vehicle-related rectifier) or a direct voltage (DC power). In choosing a DC power one of the conductors can be positive, whereas the other conductor can be negative and an additional conductor can be allotted ground potential or zero potential, with the vehicle being operated at twice the value of the voltage.

With alternating voltage to the conductor of the roadway sections said voltage can to advantage be disposed in antiphase and symmetrically around a ground potential or zero potential.

The motor intended for driving the vehicle can be of the DC power type or of the AC power type, with a converter being connected prior to the motor in the latter case.

BACKGROUND OF THE INVENTION

Methods, arrangements, and structures related to the technical field and character mentioned above are known earlier in a number of different embodiments.

With regard to electrically propellable vehicles, the latter can to advantage be categorized as "railbound vehicles" or as "non-railbound vehicles".

"Railbound vehicles" are driven along their stretch of the roadway and roadway sections on parallel rails disposed in their stretch of the roadway or on parallel rails laid open by sleepers or the like and guiding the fixed pairs of wheels of the vehicle.

"Non-railbound vehicles" are conveyed along their stretch of the roadway and roadway sections or portions over a road and are driven along the roadway sections or portions by steering control equipment associated with the vehicle.

The present invention is based on and is intended to be used in the latter category and technology and is intended to be applied primarily to heavy trucks with or without connected trailers, wherein from Patent Publication U.S. Pat. No. 4,129,203-A a vehicle-related arrangement is known for letting contact springs disposed beneath the vehicle be brought upwards and downwards and sideways towards and to mechanical and electrical cooperation with or away from cooperation with non-insulated surface sections of the electric conductors (14) subject to voltage and associated with each roadway section or portion.

Utilizing an insulator (16) in a channel (18) which supports the conductors in the form of rails (14) is indicated here. A cover plate (20) provided with a slit (12) is removably attached to the upper and opposing wall portions of the channel (18), with this cover plate (20) being adjusted to a plane connecting to the upper surface (22) of the roadway section or portion.

FIGS. 2 and 3, respectively, in the mentioned Patent Publication describe a vehicle-related table (98), to which an arm (10) is rotatably attached (94, 96, 99). Sensors (30) allotted to the table (98) generate signals which with regard to their phase and magnitude indicate the direction to and distance from an axis (99) of rotation to a slit (12) in the cover plate (20) which is based on changes in a generated magnetic field. The table (98) and arm (10) can be driven over a designated mechanism (31) by a motor (32) between predetermined limits and limit switches (40, 41) positioned there.

Patent Publication WO 93/10995-A discloses an earlier known system for driving electrically controllable vehicles along a road and its roadway sections or portions.

FIG. 9 in the mentioned Patent Publication clarifies the basic structure of the system.

It is instructed here that the extension (14) of the roadway and its roadway portions are to be provided with electrically conductive road sections (300a-300f), wherein a roadway section may be considered to correspond to a roadway portion.

The vehicle (310) has an electric motor (320) and two (312, 314) or three (312, 312' and 314, respectively) contact springs lying therebelow and being adapted for mechanical and electrical contact with the electrically conductive conductors, whose lengths are adapted to correspond to a chosen length (identically equal lengths) for utilized roadway sections or portions.

The electrically conductive conductors in the road sections (300a-399f) are disposed after each other with an intermediately oriented free space (302a-302e) so as thereby to prevent short-circuits in consequence of dragging contact springs (312, 312', 314).

All other road sections (300a, 300d, 300f) are connected here continually to a reference voltage (ground potential), whereas the remaining road sections (300a, 300c, and 300e, respectively) are either directly connectable to a source (440) of DC voltage or can be connected over a connecting means (304a, 304b, 304c) to any appropriate electric power source (308) when a vehicle is in the vicinity.

When an embodiment having three contact springs is to be utilized the distance between them is to be chosen such, that two or three contacts always are in electric contact with two road sections exhibiting opposite polarities and that neither of the two contacts is able to short-circuit the open space (302a-302e) between two adjacently positioned sections or portions.

For its function the system here requires specially structured vehicles (310), wherein the chosen distance between front (314) and rear (312, 312') contacts is to be identical and furthermore to be chosen somewhat greater than the equal lengths of the roadway sections (300b, 300d).

Thus, specially structured vehicles with front and rear contacts are required and in which each one of the utilized road sections (300a-300f) is to be chosen having equal lengths and are to be positioned behind each other in the direction of motion of the vehicle with equal mutual free and intermediately lying spaces (302a-302e).

The remainder of the Patent Publication shows the existence of a single conductor or rail subjected to voltage in a road section (Page 5, lines 11-13) and that a vehicle is to attract a voltage to a roadway section lying in front (Page 5, lines 19-21; page 6, lines 7-10; page 8, lines 28-32, respectively).

Furthermore it is indicated that bars or rails (16), which may be subjected to voltage, can be provided with side-positioned drainage tracks (page 9, lines 1-4).

Lack (or presence) of an activating signal is to be able to influence a control unit (38) (Page 8, lines 23-27, respectively).

The necessary distance between vehicle-associated contacts is disclosed in lines 17-20 of page 10, and utilizing activity-initiated radio signals is suggested in lines 2-4 of page 11 and lines 1-16 of page 14, respectively.

Furthermore, in lines 21-23 of page 15 and lines 1-15 of page 16, utilizing a Hall element (240) and connecting it to an amplifier (246) is suggested. Furthermore, alternatives thereof are illustrated in lines 3-9 of page 17.

It is also known to have a vehicle driven electrically along a stretch of roadway by means of inductive transfer of energy active between a vehicle and a roadway section and a road portion lying therebelow.

As examples of this known technology reference is also made to the contents of Patent Publications U.S. Pat. Nos. 3,914,562-A and 4,007,817-A, respectively.

Patent Publication WO-2007/056 804 A1 describe and disclose a plurality of means, devices and/or arrangements, which have relevance when evaluating the significant features related to the prior art and also to the present invention. However, these means, devices and/or arrangements are only mentioned in general terms, and only a few or no suggested structures are disclosed.

The contents of these Patent Publications will be described in the following and coordinated under the following subsections;

a. Pairs of electrically conductive contacts or strips oriented along a roadway.
b. Switching means to supply DC power to a roadway related pair of electrically conductive contacts or strips. (DC network).
c. Vehicle related transmitter.
d. Vehicle related pick-up arms.
e. DC voltage difference between roadway related conductors, contacts or strips.
f. Orientation of the roadway related conductive strips.
g. Power supply system.
h. Detector means or arrangement.
i. Power supply to an adjacent pair of conducting strips.
j. Sensor arrangement.
k. Conditions for activating switching means.
l. Battery arrangements.
m. On-board charging engine.
n. Overload cut-off and re-close switch.
o. Safe conditions of bare electric roadway related electric conductors or strips.
p. Use of DC voltage or AC voltage to supply power to the roadway related electric conductors or strips.
q. Magnetic field sensor.
r. Snow plough and blower arrangements.
s. Electrical heating tape.

a. Pairs of electrically conductive conductors or strips oriented along a roadway.

It is suggested in one of the above-mentioned International Patent Publications that each pair of electrically conductive strips (members) be electrically insulated from an adjacent and other pair of electrically conductive strips, wherein a vehicle traveling along said roadway travels over a first pair of electrically conductive strips and then travels over a next adjacent pair of electrically conductive strips and so forth.

b. Switching means to supply DC power to a roadway related pair of electrically conductive contacts or strips (DC network).

A source of direct current electricity (DC network) is arranged to provide DC power to the roadway related pairs of electrically conductive strips (members).

Switching means are operative to supply DC power to a pair of electrically conductive strips when a vehicle travels over that pair, said switching means being operative to turn off the supply of DC power to a pair of electrically conductive strips when no vehicle travels over and along that pair of electrically conductive strips.

This improves the safety of the system as suggested (page 2, lines 13-17), in that switching means are operative to supply DC power to said pair of electrically conductive strips (members) only when a vehicle travels over that pair, the switching means being operative to turn off the supply of DC power to a pair of electrically conductive strips when no vehicle travels over that pair of electrically conductive strips.

Said Patent Publication further mentions (page 1, lines 7-21) a prior art system for the universal use of electrically powered roadway vehicles. A system of this kind uses a succession of 20 meter long copper strips fixed onto a roadway surface. The respective 20 meter long copper strips were positioned end to end along each lane of the roadway and were electrically insulated from each other.

Alternating current electric power (AC network) was applied to each section or portion.

c. Vehicle-related transmitter.

When an appropriate electrically powered vehicle travels over the respective sections of copper strip, a transmitter mounted to the vehicle turns on the power supply to the section of copper strips over which the vehicle is traveling.

d. Vehicle related pick-up arms.

Electrically operated pick-up arms on the vehicle are adapted to contact the copper strips and to obtain electricity from the roadway-related copper strips.

This electricity from the copper strips is used to run a vehicle-related electric motor on board the vehicle (and also to activate vehicle accessories and, optionally, to recharge batteries in the vehicle).

The electricity supply to each copper strip is only turned on during 1.5 seconds, i.e. the time period during which the vehicle passes over that section of copper strips.

In the absence of a signal from a vehicle, the power to that section of copper strip remains off.

In order for the vehicle to be able to pick up electric power from the roadway-related conductors or strips positioned on the roadway surface, the vehicle may be provided with a pick-up arm located under the vehicle body.

The pick-up arm may comprise a flat plate hinged to the underside of the vehicle.

Two pick-up carbon brushes may be bonded to the plate, for example by an epoxy resin or adhesive.

Leads carry the power from/to each brush to the vehicle (to the motor controller and battery pack of the vehicle). (Page 7, lines 8-13)

The pick-up arm may be retracted and extended automatically.

For example, if the vehicle detects that it is traveling over a pair of electrically conductive strips (members), the pick-up arm may be automatically extended downwardly such that the brushes contact the electrically conductive strips.

In one embodiment, the electrically conductive arm is operated such, that if power is lost for more than a predetermined time period, such as from one-half to one second, the pick-up arm is automatically retracted. (Page 7, lines 14-19)

Vehicles traveling over the pairs of copper strips must be able to pick up electric power from those strips.

A large number of different designs may be used in this regard. However, one possible design is shown with reference to FIG. 2.

In FIG. 2 a vehicle 50 having wheels 52, 54, is provided with a plate 56. Plate 56 may for example be approximately 1.620 mm wide and 100 mm long.

The plate 56, as shown in FIG. 2, stretches approximately across the full width of the vehicle.

The plate 56 may be provided with one or more holes to enable air to pass therethrough to reduce the amount of down force acting on the plate when the vehicle is traveling.

The plate 56 carries two electrically conductive brushes 58, 60. A gap 62 is located between the brushes 58, 60.

As an example, each brush may be 800 mm wide and the gap may be 20 mm wide.

The gap 62 may be filled with an electrically insulating material, suitably an insulating material that is somewhat soft and can yield without breaking, should it contact an object. (Page 14, lines 7-18)

The use of a wide pick-up plate eliminates the need for a lateral traversing mechanism for the pick up arm.

It also eliminates the need for any device to detect the vehicle's lateral position in relation to the electrically conductive strips.

All a driver has to do to achieve initial contact is to drive along the electrically conductive strips somewhere within the vehicle's track and move the pick-up arm to the down position.

Contact will be maintained so long as the electrically conductive strips remain within the vehicle track.

Automatic steering may be used to assist in this regard on a longer drive. (Page 14, lines 27-30, page 15, lines 1-2)

The brushes 58, 60 must be able to be lowered onto the strips or retracted against the underside of the vehicle.

To this end, the brushes are mounted on a pair of pantograph arms 64, 66.

The pantograph arms keep the plate 56 (and therefore the brushes 58, 60) horizontal.

Appropriate electrical connections may be provided to enable the electrical power picked up from each of the brushes 58, 60 to be transferred to the vehicle.

The pantograph arms may carry appropriate electrical cables to transfer electric power from the brushes to the vehicle. (Page 15, lines 4-10)

e. DC voltage difference between roadway related conductors, contacts or strips.

It is further suggested (Page 2, lines 18-22) that preferably a DC power with its voltage exposes a difference between each conductor or strip in a pair of conductors and that said voltage does not exceed 600 volts. More preferably, the DC power and its voltage difference between each conductor in a pair of conductors or strips do not exceed about 450 volts. Suitably, each conductor is at a voltage relevant to ground that does not exceed plus or minus 250 volts, more preferably not exceeding plus or minus 225 volts.

f. Orientation of the roadway related conductive strips.

The electrically conductive strips may be positioned on the roadway surface such that they are insulated from each other and from ground (the road surface). Suitably, the electrically conductive strips are laid onto an adhesive insulating base, which insulates them from each other.

The electrically conductive strips may be bonded to the roadway surface by an epoxy adhesive. Alternatively, the electrically conductive strips may be bonded to tiles that are then placed in or on the roadway surface.

g. Power supply system.

The power supply system comprises a series of separate, electrically insulated but electrically conductive strips.

Each pair of strips represents a power supply section.

Each pair of strips may be provided with a dedicated source of DC power.

Alternatively, a source of DC power may provide direct current electricity to two or more pairs of strips.

h. Detector means or arrangement.

The switching means is suitably operatively associated with a detector means for detecting the presence of a vehicle either about to move onto a pair of conductors or strips or on a pair of conductors.

For example, the coded signal may comprise an oscillating voltage similar to that used by utility companies for control purposes.

Such a control signal may have a frequency in the order of 400 kHz and a voltage of up to about 4 to 20 volts.

It will be understood that the coded signal may utilize different frequencies and different voltages from those given above. (Page 4, lines 19-29)

When one roadway section of conductors or strips is turned on, a control signal may be sent to the power supply for the next section of conductors along the path of travel of the vehicle.

This control signal sent to the power source for the next section of conductors or strips is used to turn on the power supply to the next section of conductors, either shortly before or just as the vehicle arrives at the next section of conductors.

Alternatively, the control signal sent to the next section of conductors or strips may turn on the power supply to that next section of conductors a predetermined time after the power supply to the first set of conductors or strips is activated.

In order to detect the arrival or imminent arrival of a vehicle in a section of copper strips, the vehicle may be provided with a coded signal that becomes superimposed on the strips when the vehicle travels over a section or portion of the copper strips and the brushes on the vehicle are in contact with the strips.

The coded signal is received by a detector associated with a corresponding transformer station.

The detector actuates the switching of power up to that particular section of the strips.

i. Power supply to an adjacent pair of conductive strips.

The power supply to the next set of conductor means or strips is maintained, provided that the next set of conductors or strips detects that the vehicle enters the next set of conductors or strips within a specified time period after the power supply to the next set of conductors or strips has been turned on.

In this way, if the vehicle turns off the roadway and therefore does not enter the next set of conductors or strips, the next set of conductors or strips will not detect the presence of the vehicle and therefore will shut off the power supply shortly after it has been turned on.

In this embodiment, the adjacent sections of conductors "talk" to each other and interact with each other to turn on the power supply to each roadway section with its strips either just before or just as a vehicle arrives at each section.

j. Sensor arrangement.

A sensor arrangement may be located towards the "downstream" end of each pair of strips.

The sensor arrangement may, for example, be a current flow sensor positioned below or adjacent to one of the electrically conductive strips.

When a vehicle is near the end of a roadway section (of electrically conductive strips), the sensor will sense the resultant current flow and then send a signal to the next section of electrically conductive strips to turn on the electricity supply to the next section in "anticipation" of the imminent arrival.

This signal may be sent via cable. The "anticipatory" signal is valid for a short time only, say 2 seconds, and if a vehicle has not arrived at the next section within that time, the next section is turned off.

k. Conditions for activating switching means.

The switching means may be arranged such that the signal that is used to turn on the next pair of conductive strips must be larger than a predetermined minimum value in order to activate the switching means and turn on the next pair of conductive strips.

In this manner, if the next pair of conductive strips is subject to conditions of high electric leakage, the signal will be lower than the minimum required to turn on the next pair of strips.

This is effective to minimize excessive electrical leakage which could lead to unacceptable power wastage and/or to damage to the transformer/rectifier. (Page 4, lines 28-29, page 5, lines 1-4).

The use of a coded signal also allows for the possibility of enhanced operation and safety by incorporating an electricity leakage test into the apparatus.

In these instances, an electrical leakage detection means may be provided to prevent the next section of conductors or strips from turning on.

Detection of electrical leakage may occur by requiring the coded signal superimposed on each section of conductors or strips to exceed a predetermined activation threshold value before the next section of conductors or strips will be turned on.

In this fashion, superimposing the coded signal onto the conductors or strips will result in the coded signal representing the criteria not exceeding the predetermined threshold value if conditions of high electric leakage are present. Thus, the next section of conductors or strips will not be turned on in such situations. (Page 8, lines 15-28)

l. Battery arrangements.

The vehicle may be provided with one or more batteries to store electric power or energy.

The batteries may be charged using electricity received from the roadway related electrically conductive strips.

In some embodiments, the DC voltage of the electrically conductive strips is such that it is equal to the normal charging voltage of each battery pack in the vehicle.

This allows for the vehicle motor to have an essentially seamless transition to and from battery and on-road conductors or strips, whenever there is a break and then a resumption of the on-road conductors or strips. (Page 6, lines 29-30, page 7, lines 1-5)

m. On-board charging engine.

The vehicle may alternatively or additionally be provided with one or more of an onboard charging engine or a regenerative braking system to allow for recharging of the batteries. (Page 7, lines 6-7)

n. Overload cut-out and re-close switch.

Each transformer may have an overload cut-out and re-close switch.

This switch suitably operates on the DC side of the transformer and a rectifier. Each DC output line from the transformer and rectifiers may have independent overload switches.

The overload cut-out and re-close switches may be set such that if three re-close attempts are unsuccessfully made, the section is shut down and a signal is automatically sent to the control panel to indicate a fault.

Vehicles may then proceed across this dead section using an on-board battery power system. (Page 12, lines 10-16)

o. Safe conditions of bare electric roadway related electric conductors or strips.

A question may be raised as to whether bare electric conductors or strips onto a road surface can be safe? In the system here proposed, they are safe.

In particular, the present invention uses mains power but delivers DC voltage at relatively low volts.

Moreover, each copper conductor or strip is insulated from the roadway surface and from the other copper conductor or strip in its respective pair.

Thus, standing on one of the conductors or strips will not complete any circuit and therefore little or no current will flow through a person standing on one of the copper conductors or strips.

Further, the DC voltage supply to the conductors or strips is created by transforming and rectifying high voltage, three-phase (alternating current) AC power, to give a positive DC power to one conductor or strip and an equal negative DC power to the other conductor or strip in each pair of conductors or strips. (Page 12, lines 19-20)

p. Use of DC voltage or AC voltage to supply power to the roadway related electric conductors or strips.

The use of DC voltage rather than AC voltage contributes to the electrical safety of the system.

The actual DC voltage that is supplied to the pairs of copper conductors or strips will depend upon several factors.

For example, the lower the standard DC voltage selected, the lower will be the perceived electrical safety risk, the lower will be the actual energy leakage, when a roadway is wet and the conductors or strips are on and the fewer the number of battery cells in each vehicle to provide an on-board power supply.

On the other hand, the weight of copper conductors or strips and/or the number of transformers needed for the on-road installation is inversely proportional to the square of the standard voltage.

That is to say, other things being equal, if the voltage is halved, the weight and cost of copper material needed will rise fourfold.

It has been found that possible standard voltages may lie anywhere between about 100 and 600 DC voltage. (Page 12, lines 3-12)

q. Magnetic field sensor.

An array of magnetic field sensors may be placed across the front and rear of the vehicle (Page 20, lines 3-9) to sense the position of the conductive strips.

r. Snow ploughs and blower arrangements.

The use of snow ploughs and blower arrangements is also suggested. (Page 21, lines 28-30.)

s. Electrical heating tape.

It is also suggested to use an electrical heating tape beside each conductor or strip to aid the clean removal of snow and ice in winter time. (Page 22, lines 1-3.)

The present invention intends to concentrate on a vehicle-related snow plough arrangement adapted to serve for influencing and cleansing a track lying below the vehicle along the stretch of the roadway with regard to loose and solid obstacles, such as particles of snow and ice, the cleansing means serving as said plough arrangement has the shape of a contact means or a current collector intended to cooperate with conductors, capable of being subjected to electric voltage disposed in individual tracks, where such cleansing means is to be able to be displaced when the vehicle is driven forward and for example can be disposed, counting in the direction of movement, as a unit or means in front of a current collector and/or be shaped as a current collector.

The snow plough arrangement, according to the present invention, can also be allotted a snow plough chassis and can be positioned behind the plough blade itself, counting in the direction of movement.

DISCLOSURE OF THE PRESENT INVENTION

Technical Problem

If the circumstance is considered, that the technical considerations that a person skilled in the relevant technical art will have to carry out in order to offer a solution of one or more posed technical problems are on the one hand initially a necessary insight into the measures and/or the sequence of measures which are to be performed and on the other hand a necessary choice of the one or several means which are required, the following technical problems must be considered to be relevant in consequence hereof in producing the present subject of invention.

Considering the earlier standpoint of technology as it has been described above, it should therefore be seen as a technical problem to be able to understand the significance of, the advantages related to and/or the technical measures and considerations which will be necessary for conveying an electrical, and by i.a. one or more batteries in a set of batteries, conveyable vehicle along a stretch of a roadway and its roadway portions adapted system, which is to comprise; "a" a plurality of road sections or portions for subdividing the stretch of the roadway, wherein each one of these roadway portions is allotted one or more elongated tracks or slits having introduced therein current supplyable and under voltage placeable electrically conductive conductors or strips, connectable over a switch to one or more power sources as stationary electric stations, serving as an external source of power (designated as a third source of power in the following) of the vehicle so as to thereby i.a. charge said set of batteries associated with the vehicle, which set is to be able to propel the vehicle directly along the roadway sections, and "b" one or more vehicles, propellable over an individual electric motor or motors, and wherein the respective vehicle exhibits a control circuit, controlling the necessary power for creating necessary power and/or speed control, indicating the possibility of utilizing equal or different lengths of parallel electric conductors or strips, which may be subjected to electric power or voltages, related to mutually electrically insulated road sections so as to therein offer a possibility of choosing the lengths of the conductors and road sections in response to established requirements of a "continuous" supply of energy to the vehicle and its set of batteries and wherein the lengths of the respective roadway sections to advantage can be chosen considerably longer than the total length of the vehicle, so that no adaptation of the lengths of the road sections to any standard lengths of the vehicles will be required such as in known technology.

There is a technical problem or a technical consideration in being able to understand the significance of, the advantages related to and/or the technical measures and considerations which will be required for in a snow plough arrangement adapted to be utilized along a track and along the stretch of the roadway and intended to pass loose objects, such as snow, ice and/or water but also sand, gravel and the like, as a cleansing effect and for solid objects yieldable means, which in its upper portion over a horizontally disposed axis of rotation is to be rotatably fastened so that cleaned material and/or stationary obstructions, are movably positioned in vertical direction to and from a chassis allotted to the vehicle or a snow plough arrangement over a resilient or spring means.

There is a technical problem in being able to understand the significance of, the advantages related to and/or the technical measures and considerations which will be required for letting the snow plough arrangement and/or its cleansing means be retained in a format disposed in the direction of motion with a forwardly directed edge portion, said edge portion being allotted a pointed area, which may be connected to or arranged adjacently to the bottom of the track and its conductor or the bottom of the track.

There is a technical problem in being able to understand the significance of, the advantages related to and/or the technical measures and considerations which will be required for having the angular value of the pointed area or edge portion chosen to fall within the angular area of 30° to 60°, such as around 45°.

There is a technical problem in being able to understand the significance of, the advantages related to and/or the technical measures and considerations which will be required for letting said resilient or spring means as a member be dimensioned for a limited vertical force active against a conductor and its conductor surface and/or the bottom of the track.

There is a technical problem in being able to understand the significance of, the advantages related to and/or the technical measures and considerations which will be required for letting said edge portion be allotted an angular value with regard to the track so as by its speed along the track, to throw snow, ice, and/or water but also an obstacle and/or obstacles in a direction upwards and away from the track.

There is a technical problem in being able to understand the significance of, the advantages related to and/or the technical measures and considerations which will be required for letting the snow plough arrangement its lower surface be somewhat bent upwards from the conductor and the bottom of the track adjacent to its pointed area.

There is a technical problem in being able to understand the significance of, the advantages related to and/or the technical measures and considerations which will be required for letting the snow plough arrangement and/or the cleansing means be allotted a shape, which is adapted to cause a contact to and/or from a contact surface.

There is a technical problem in being able to understand the significance of, the advantages related to and/or the technical measures and considerations which will be required for in a current collector, related to a vehicle as stated above, and which collector is intended to run freely along the track disposed along the stretch of the roadway and letting the snow plough arrangement, the cleansing means and/or the current collector be formed of a main portion, made of an electrically insulating material, whose lower surface facing the conductor surface, which may be subjected to voltage, or having the bottom of the track made flat or at least substantially flat with a lower contact surface made in said lower surface and consisting of an electrically conductive material, with said electrically conductive material to be adapted to extend through the main portion so as to the upper surface of the main portion form one or more conduct areas or connecting conductors.

There is a technical problem in being able to understand the significance of, the advantages related to and/or the technical measures and considerations which will be required for letting an upper and a lower surface of a parallelepiped be adapted to be parallel or at least substantially parallel.

There is a technical problem in being able to understand the significance of, the advantages related to and/or the technical measures and considerations which will be required for letting two or more current collectors, arranged in an extension along the track, be coordinated with one and the same conductor surface, to be subjected to voltage, and apart from this to be adapted to form circuits connected in parallel.

There is a technical problem in being able to understand the significance of, the advantages related to and/or the technical measures and considerations which will be required for letting a first main portion, be allotted a parallelepipedic shape, which is to deviate slightly from a parallelepipedic shape of a second main portion for another current collector.

There is a technical problem in being able to understand the significance of, the advantages related to and/or the technical measures and considerations which will be required for shaping two or more lower contact surfaces to said lower surface of a main portion.

There is a technical problem in being able to understand the significance of, the advantages related to and/or the technical measures and considerations which will be required for letting a resilient or spring member be adapted to urge the main portion, such as with its lower contact surface or lower contact surfaces, against the upper surface of a conductor, which may be subjected to voltage, or the bottom of the track, with an adapted force.

There is a technical problem in being able to understand the significance of, the advantages related to and/or the technical measures and considerations which will be required for letting two or more cleansing means and/or current collectors be disposed parallel and allotted individual ones of two or more parallel tracks along the stretch of the roadway.

There is a technical problem in being able to understand the significance of, the advantages related to and/or the technical measures and considerations which will be required for letting the snow plough arrangement serving as a current collector, with at least its lower contact surface be made of steel, stainless steel, copper, brass, bronze, aluminum and/or hard coals.

There is a technical problem in being able to understand the significance of, the advantages related to and/or the technical measures and considerations which will be required for letting the snow plough arrangement, serving as a current collector, be allotted at least along a lower contact surface, the form as a brush unit, consisting of steel, stainless steel, copper, brass, bronze, aluminum and/or hard coals.

There is a technical problem in being able to understand the significance of, the advantages related to and/or the technical measures and considerations which will be required for letting the snow plough arrangement face allotted to the conductor be made of steel, stainless steel, copper, brass, bronze, aluminum and/or hard coals.

There is a technical problem in being able to understand the significance of, the advantages related to and/or the technical measures and considerations which will be required for letting the lower surface of the cleansing means and/or a lower contact surface be adapted with a force, of between 1 and 15, such as 2 to 4, by way of suggestion around 3 $N/cm^2$, adapted to engage said conductor surface, which may be subjected to voltage, or the bottom of the track.

There is a technical problem in being able to understand the significance of, the advantages related to and/or the technical measures and considerations which will be required for letting said two or more conductors which may be subjected to voltage be coordinated to the bottom of their respective tracks in a common canalization.

There is a technical problem in being able to understand the significance of, the advantages related to and/or the technical measures and considerations which will be required for letting said conductor surface (-s), which may be subjected to voltage, have the shape of rails, with an upper broad contact surface and a limited thickness.

There is a technical problem in being able to understand the significance of, the advantages related to and/or the technical measures and considerations which will be required for letting a canalization adapted to said plough arrangement be produced as a flexible unit and bendable to a roll.

The Solution

As its starting point this invention utilizes the known technology indicated by way of introduction and is based on a vehicle-related plough arrangement, said vehicle is equipped with a control unit and a vehicle-related charging system for adapting in an electrically, i.a. by one or more batteries or a set of batteries, conveyable vehicle being driven along a stretch of a roadway and its associated roadway sections or portions, wherein this system may comprise; "a" a plurality of roadway sections or portions subdividing the extension or stretch of the roadway, wherein each one of these road sections or portions is allotted one or more elongated tracks, grooves or slots, having introduced there in conductor bare surfaces, such as conductors or strips, said surfaces may be supplied with power or current and which may be placed under voltage by means of a switch to one or more power sources external to the vehicle, such as electric stations, so as to thereby be able to charge said set of batteries allotted to the vehicle, but primarily over said set of batteries driving the vehicle along the extension of the roadway and its roadway portions, and "b" one or more vehicles which may be driven by an electric motor or motors and wherein the respective vehicles exhibit a power control circuit for required power adapted for creating a required power and/or speed control, wherein said vehicle, on its underneath side, is provided with an up and down and sideways, respectively, counted crosswise to the direction of transportation of the vehicle, displaceable contact means and in which said elongated tracks, grooves or slots extend along the roadway of the road sections or portions, with said contact means being coordinated with vehicle related control equipment or an arrangement for creating an adaptation of the contact means at least to offer mechanical and electrical contact to said conductor or strip, wherein coordination between the voltage-carrying conductors allotted to the road sections or portions and the contact means of the vehicle occurs over coordinated current collectors or removers, such as in the form of contact springs, adapted for mechanical and electrical cooperation with respective ones of the voltage-carrying conductors or strips.

This invention has the purpose of indicating a further development of the arrangement mentioned above in the system mentioned above and apart from this to indicate building on the prerequisites mentioned above by indicating a utilization of a snow ploughing arrangement adapted to means for cleansing the track (with the conductor) from snow, ice and water and from loose particles as well as means, which may be folded or pivoted away by solid obstacles, wherein this means is to be related to the chassis of a snow plough and/or to the lower portion or chassis of the vehicle and is to be intended to be displaced along the bottom of the track and its conductor surface, which is subjected to voltage.

Thus the present invention indicates more specifically a snow plough arrangement in the form of a means cleansing the track from snow, ice, and water, and obstacles such as sand, gravel or the like and being foldable away from more stationary obstacles and to be rotatably fastened in its upper area over a horizontally oriented axis of rotation.

The arrangement and/or the cleansing means and said axis of rotation are to be movably attached in a vertical direction towards and away from a chassis, allotted to the snow plough and/or the vehicle via spring means.

The means is, in an area disposed in the direction of motion, to be provided with a forwardly directed edge portion, which edge portion is to be allotted a pointed portion being connected to the track and its conductor surface.

The angular value of the pointed portion is here suggested to fall within the angular area of 30° to 60°, such as around 45°.

A resilient or spring member is here to be dimensioned for a limited vertical force against the conductor surface disposed in the track or at the bottom of the track.

Said edge portion is to advantage to be allotted an angular value, with regard to the extension of the track so as to be able to throw obstacles, in the form of snow, ice, water and/or solid obstacles, in a direction upwards and away from the track in consequence of its speed along the track.

A lower flat surface area can then be somewhat bent upwards from the track in connection with its pointed portion.

The shape of the snow plough arrangement and/or the cleansing means is to advantage to be adapted to connect to the shape of a current collector.

The vehicle related or plough related snow plough arrangement and/or the current collector are to be intended to be able to run freely along the track disposed along the stretch of roadway, and a snow plough arrangement, in the form of a current collector, is to be formed from a main portion made of an electrically insulating material, whose lower surface facing the bottom or facing the conductor surface being subjected to voltage, can be shaped flat or at least essentially flat having a lower contact surface formed within said lower surface and consisting of an electrically conductive material, with the electrically conductive material being adapted to extend through the main portion for forming one or more upper contact areas or connecting conductors to the upper surface of the main portion.

The main portion is then to be allotted surfaces along the track and having a thickness close to but somewhat less than the width of the track and having the shape of a parallelogram or a parallelepiped or similar to such.

The upper and lower surface extensions of said parallelepiped can be adapted to be parallel.

Two or more arrangements in the form of current collectors are in an extension along the track coordinated with one and the same conductor surface which can be subjected to voltage, and apart from this adapted to form electric circuits connected in parallel.

A first main portion for one current collector can be allotted a parallelepipedic shape which deviates from a parallelepipedic shape of a second main portion for another current collector.

Two or more contact surfaces are allotted to said lower surface for a current collector and its main portion.

Spring means are to be adapted to urge the snow plough arrangement and its main portion (and its lower contact surface or lower contact surfaces) against the conductor surface, which may be subjected to voltage, or the bottom of the track.

Two or more current collectors are disposed in parallel and allotted to individual ones of two or more parallel tracks.

The snow plough arrangement, such as in the form of a current collector, is at least in its lower surface made of steel, stainless steel, copper, brass, bronze, aluminum and/or hard coals.

The current collector is allotted at least a lower contact surface, which is shaped as a brush unit, consisting of steel, stainless steel, copper, brass, bronze, aluminum and/or hard coals.

The conductor which may be subjected to voltage is to be made of steel, stainless steel, copper, brass, bronze, aluminum and/or hard coals.

The lower contact surface is adapted to engage the bottom and/or said conductor surface, which may be subjected to voltage with the force of between 1 and 15 $N/cm^2$.

Said two or more conductor surfaces, which may be subjected to voltage, are coordinated to the bottoms of their respective tracks within a canalization.

Said conductor surfaces, which may be subjected to voltage, are shaped as rails having an upper broad contact surface and a limited thickness.

The canalization is as a unit flexible and to bendable to a roll.

Advantages

The advantages which primarily must be considered to be characterizing of the present invention and the thereby indicated specific significant characteristics are that thereby prerequisites have been created for in a vehicle-related arrangement to expose snow plough arrangements.

It is here indicated that the vehicle and its vehicle-related arrangement and/or cleansing and yieldable means for solid objects can be shaped as a current collector intended to run freely along the track disposed along the stretch of road, that the arrangement, means and/or current collector can be formed as a main portion made of electrically insulating material whose lower surface facing the bottom of the track and/or the conductor surface, which may be subjected to voltage, is shaped to be flat or at least essentially flat, as a suggestion with a lower contact surface within said lower surface and consisting of an electrically conductive material and that the electrically conductive material is to be adapted to extend through the main portion so as to let the upper surface of main portion form one or more upper contact surfaces or connecting conductors.

This, the invention concerns a snow plough arrangement having a yieldable means cleansing the track from loose obstructions, such as snow, ice, water, but also sand, gravel and similar, and being yieldable to solid obstructions, which arrangement in its upper area is to be rotatably fastened over a horizontally oriented axis of rotation, wherein the cleansing means and said axis of rotation are movably attached in vertical direction, towards and away from a snow plough chassis and/or a chassis allotted to the vehicle over a resilient or spring member.

The snow plough arrangement and/or the cleansing means is within a portion oriented in the direction of travel shaped with a forwardly directed edge portion, which edge portion should be allotted a pointed area or portion, which may be connected to the track and its bottom or conductor surface.

The primary subject matter of a snow plough arrangement related to a vehicle, in accordance with the present invention, is disclosed in the characterizing portion of the following patent claim 1.

SHORT DESCRIPTION OF THE DRAWINGS

Figure 1B:
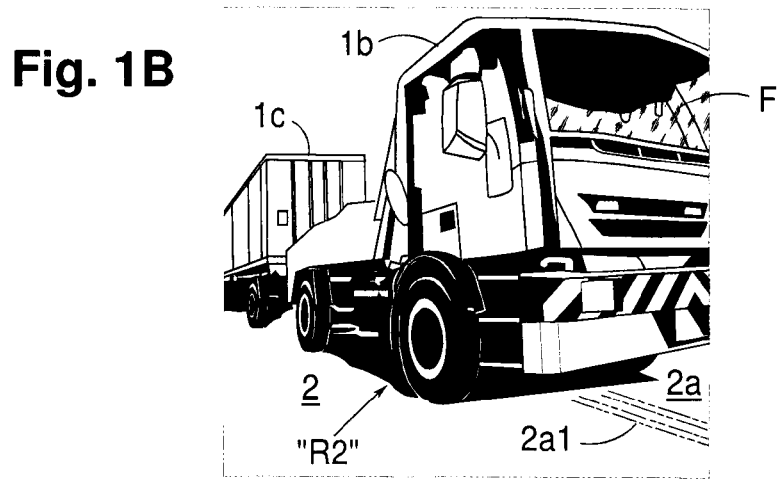
Figure 1C:
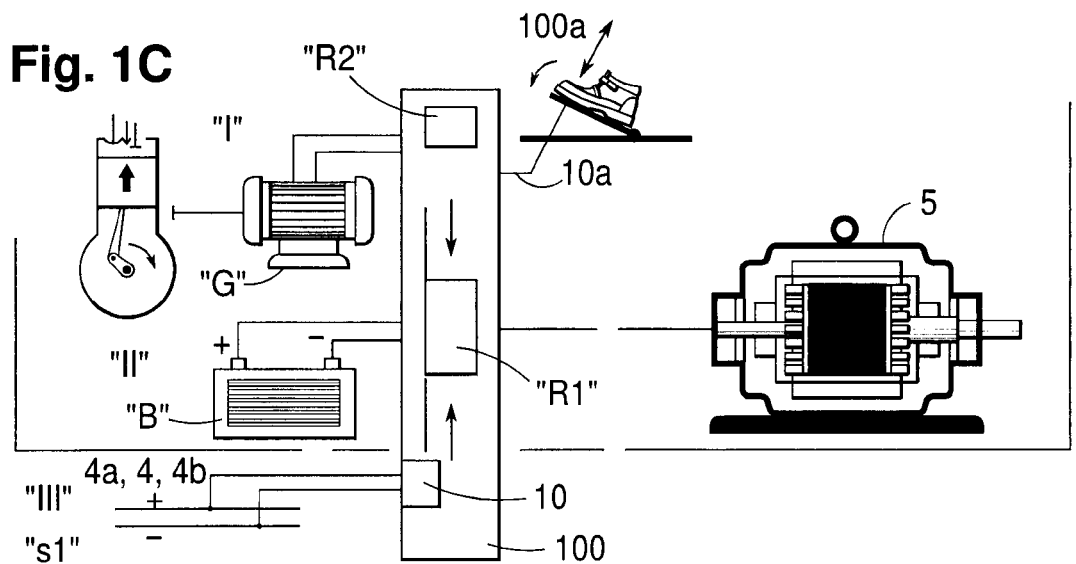
Figure 5:
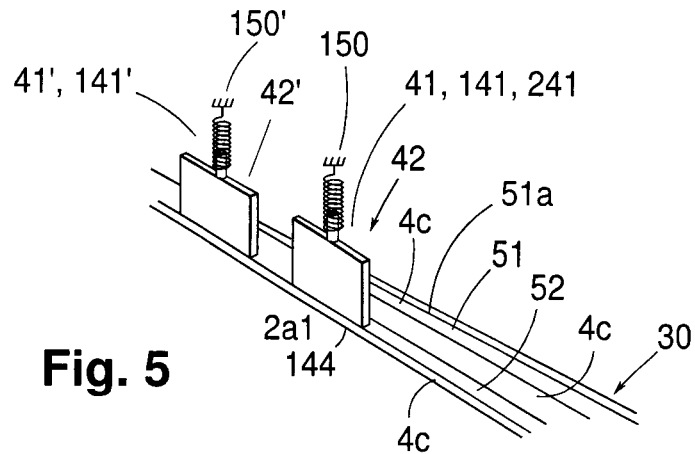
Figure 6A:
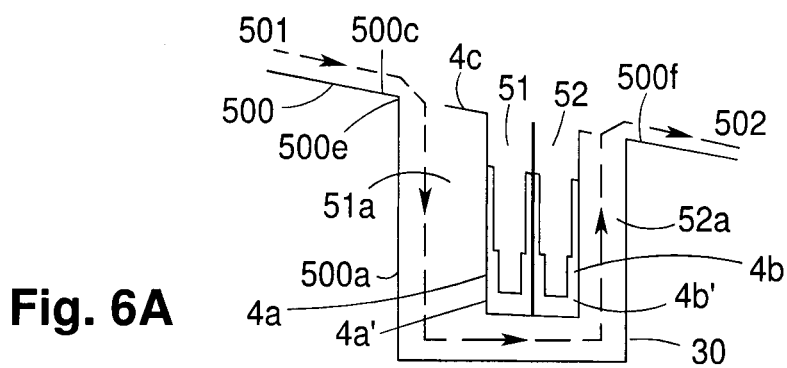
Figure 6B:
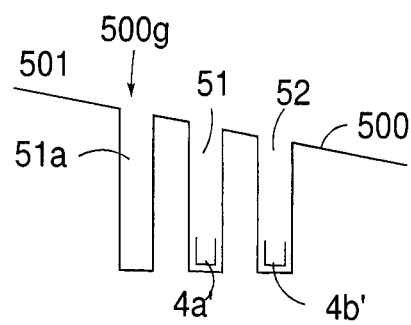
Figure 7:
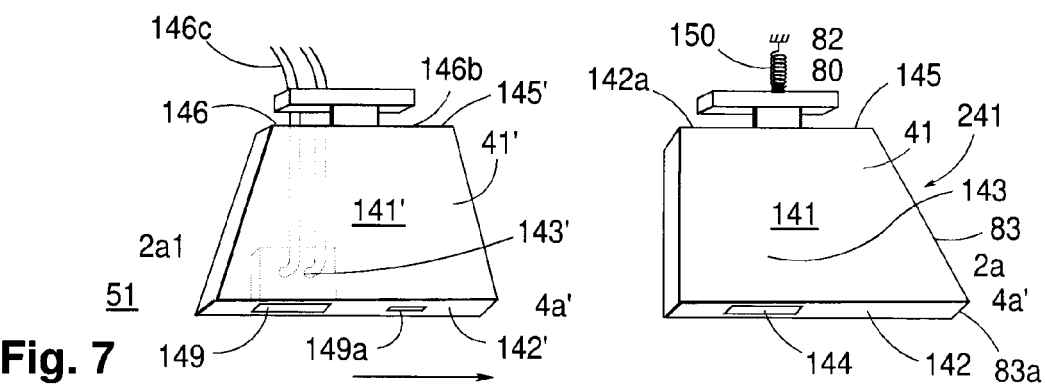
Figure 8:
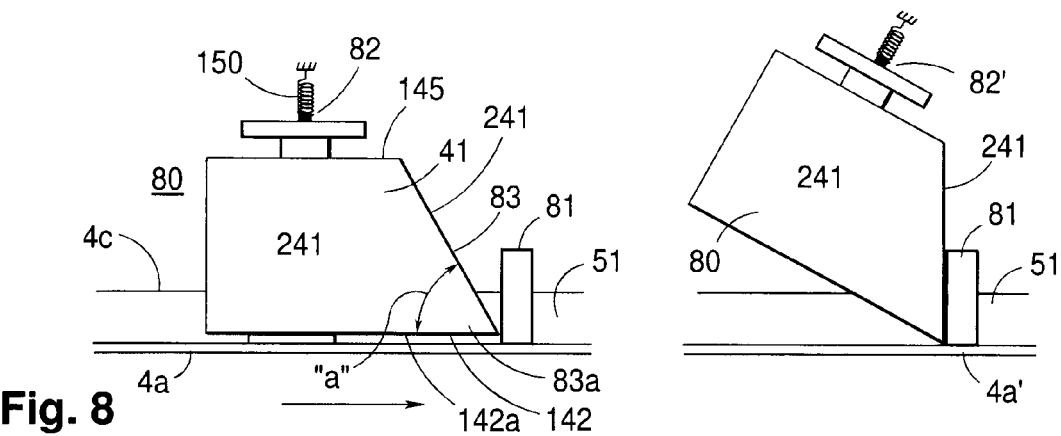

Prior art and presently proposed embodiments, exhibiting the significant characteristics related to the present invention, will now, as an example, be described more specifically with reference to the accompanying drawings in which;

FIG. 1A shows a perspective view of a vehicle, illustrated as a Ford Model A, converted to being battery powered and having an electrically powered engine or motor, a control circuit, controlling the power for speed control and adaptation to an instantaneously acting load and necessary power as well as a control arrangement or control equipment intended for use in driving and steering the vehicle, FIG. 1B shows a perspective view of a truck with a trailer and with a control circuit controlling the power in accordance with the basic principles of FIG. 1A, FIG. 1C shows in an overview that two vehicle-related power sources, a first one ("I"), a diesel generator, a second one ("II"), a battery or a battery set, and a third one ("III"), an external source of power to the vehicle, feeding electric power to parallel conductor surfaces, such as rails or strips, which may be subjected to power or voltage and which surfaces are arranged in continuous grooves in a roadway and coordinated to a vehicle-related control circuit, which in response to a necessary supplied power to an electric motor makes possible the selection of all or a combination of the power-feeding sources of energy, wherein the power control is illustrated here as a throttle having its motion related to a control circuit "R2", FIG. 1D illustrates a P/t-diagram (power/time) wherein full power or reduced power is to be transferred over the control circuit to the vehicle to pass along a roadway, its road sections or portions and its conductors or strips, FIG. 2 basically shows an electric arrangement related to a vehicle having control equipment for controlling a current collector or commutator arranged against electric contact surfaces, with paired conductors shaped as rails or strips for enabling parallel operation of an electric vehicle-related motor from one or both of the two power sources (first and second ones) related to the vehicle and/or from a stationary (third) source of power related externally to the vehicle or the peripheral (third) source of power, FIG. 3 shows an end view of a vehicle with its downwardly directed contact means or current collectors in the form of sliding contacts in cooperation with two individual contact surfaces, such as conductors, strips or rails allotted to the road section or portion and being under power or tension, FIG. 4 shows an example of an electric arrangement in which a number of road sections or portions are provided with parallel contact surfaces, such as conductors or strips under power or tension, each one being connectable over a switch to its vehicle external or peripheral electric station and in which roadway section or portion after roadway section or portion may be activated and are placed under power of voltage by activating a coupling means or a switch over a control unit as said vehicle passes roadway section after roadway section, FIG. 5 shows a perspective illustration of the manner in which a snow plough arrangement together with pairs of current connectors cooperates with its track and two or three tracks or individual conductor surfaces, which may be subjected to voltage, FIG. 6A shows a cross section of a canalization with two conductor surfaces, which may be subjected to electric voltage, and which are disposed in individual tracks in the canalization as well as a third track for a protection against water collecting with regard to the conductor surfaces and which third track can cooperate with its means for cleansing the track of obstacles and yielding for solid obstacles, with FIG. 6B showing an alternative cross section, FIG. 7 illustrates the construction of two current collectors disposed after each other in a normal and chosen direction of travel of the vehicle along a track, where the right collector is formed as a snow plough arrangement, and FIG. 8 illustrates in two positions, different in time, a snow plough arrangement in the form of a current collector and in the function of a cleansing means for cleansing the track of loose obstacles and yieldable by solid obstacles when this means engages a solid obstacle and when said means has turned around its axis of rotation to a position where the obstacle can be passed.

DESCRIPTION OF THE PRESENTLY PROPOSED EMBODIMENTS

By way of introduction it shall be mentioned that in the following description of presently proposed embodiments exhibiting the significant characteristics related to the invention and being clarified by the figures illustrated in the accompanying drawings, we have chosen terms and specific terminology with the purpose of thereby primarily clarifying the concept of the actual invention.

However, in this connection it should be noted that the terms chosen here shall not be seen as limiting solely to the terms utilized and chosen here and it should be understood that each such chosen term is to be construed such that it in addition will be able to include all technical equivalents which operate in the same manner or essentially the same manner so as thereby to be able to achieve the same or essentially the same purpose and/or the same technical result.

Thus, with reference to the accompanying drawings the basic prerequisites of the present invention are shown schematically and in detail, with the significant characteristics related to the invention being concretized in consequence of the now proposed and in the following more specifically described embodiments.

Thus, FIG. 1A shows a system "S" adapted for driving an electrically, and by one or more batteries or a set of batteries, propellable vehicle 1 along a stretch of a roadway 2 and its roadway sections or portions 2a1 and 2a1'. (FIG. 4).

Exteriorly the vehicle 1 consists of a Ford Model A, but this is converted to a battery powered vehicle having continuous access to an external third source of power or energy, which here is designated "III" and "s1" for a stationary station.

The vehicle 1 according to the invention is also to comprise a not shown steering arrangement 3 or steering equipment so that a driver "F" (not shown) can drive and steer the vehicle 1 along said stretch of roadway 2 and its road section or portion 2a1.

Vehicle 1 would also be able to include a gear box and other parts and components which are required for advancing the vehicle, but as these parts are well-known to a person skilled in the art they will not be described in detail.

However, an electrically driven vehicle 1 does not need a gear box as speed control and adapted power can occur over known electric and electronic circuits.

In the same manner as FIG. 1A, FIG. 1B shows an electrically propellable truck 1b with a connected trailer 1c along the stretch of roadway 2, 2a and its associated roadway section or portion 2a1.

FIG. 1C clearly shows two vehicle-related and vehicle-associated sources of power which here are designated "I" and "II", a "first" one in the form of a diesel generator "G", a "second" one in the form of a battery or a set of batteries "B", and a "third" one "III" in the form of a source of power positioned externally of the vehicle 1, here taking the form of parallel conductive surfaces, such as conductors, rails or strips, which may be subjected to power or voltage over switching means or switches and introduced into tracks, grooves and/or a cavity along each roadway section or portion along the entire stretch of the road 2.

In FIG. 1C the three sources of power are coordinated to a vehicle-related power control circuit 100, which in response to a power supplied to an electric driving motor 5 chooses all or a combination of the three power feeding energy sources "I", "II" and "III", respectively. Here the power control is illustrated as a throttle 100a, the movement of which upwards and downwards is connected to a control circuit "R2" in power control circuit 100, which in turn is related to a circuit "R1" distributing power and energy between the three power sources.

In a P/t (power/time) diagram FIG. 1D illustrates how full power or reduced power can be distributed and transferred for passage of the vehicle 1, 1b along different roadway sections or portions 2a1 of a roadway or stretch of a roadway 2 with the help of said circuit "R1" and control circuit "R2" and the power control circuit "100".

Between moments $t_1$-$t_2$ it is basically illustrated how a complete removal of power from the three power sources "I", "II" and "III", respectively, can be carried out, with the power taken out from the power source "I" illustrated at the top, the power taken out from power source "II" illustrated there below, and the power taken out from power source "III" illustrated at the bottom.

Reduced removal of power from power sources "I" and "II" is basically illustrated between the points of time $t_3$-$t_4$, whereas power source "III" is shown disconnected in this case.

Reduced removal of power from power sources "II" and "III" is illustrated basically between the points of time $t_5$-$t_6$.

During this time period $t_5$-$t_6$ full power can be achieved from power source "II", and a small surplus can be permitted to be fed to the motor 5 and trickle charge the battery set "II", "B".

The invention is based on that the set of batteries "B" and the second power source "II" but particularly the third power source "III" primarily shall, over the distributing circuit "R1", supply motor 5 with power, and for this purpose the set of batteries "II", "B" will have to have stored power and apart from this will have to be dimensioned so as to drive motor 5 at full power.

The set of batteries "II", "B" is primarily to be trickle charged via power source "III", "s1" and secondarily to be trickle charged or charged over power source "I", "G".

The power or energy from power sources "I" and "III" can be chosen to be 5-30% of the power or energy associated with power source "II", "B", such as around 25%.

The supply power or voltage to motor 5 can be chosen to +400 VDC and −400 VDC, i.e. the voltage value of 800 VDC is to be fed to the motor 5.

System "S" in FIG. 1A is then primarily to comprise "a" one or more over an individual electric motor 5 or motors electrically powerable vehicles 1, 1b, with the respective vehicle exhibiting a power distributing and/or controlling control circuit "R1" within said power control circuit 100 and for creating necessary power and/or a speed control via a control circuit "R2" and a throttle arrangement 100a.

The necessary output power is to be supplied primarily by the vehicle-internal power source of energy "II", "B", which secondarily is to be placed under trickle charging from the third power source of energy "III", "s1".

The stretch of a roadway 2 is in FIG. 4 shown divisible into road sections or portions 2a (2a1, 2a2, 2a3); 2b(2a1', 2a2' and 2a3'), wherein each one to advantage can be allotted an external power source "III", which here is illustrated as a number of electric stations "s1", "s2", "s3"; "s1'", "s2'", "s3'".

Of the third power source "III", "s1", external to the vehicle 1 and/or the first power source "I", "G", associated with the vehicle, one or both can thereby be utilized for supplementary charging the set of batteries "II", "B" of the vehicle 1 during an adapted time sequence of power removal from this set of batteries.

Within the scope of the invention there is also the possibility of in addition to driving the vehicle 1 via the set of batteries "II", "B" and in supplementary charging of the set of batteries "II", "B" along the road sections or portions and the stationary electric station "s1" or any of the third power sources of energy "III", any additional necessary power and energy for driving the vehicle 1 over a road section or portion 2a1 can be supplied via power source "I", "G" associated with the vehicle.

FIG. 2 basically shows an electrical/mechanical switching arrangement "K" related to a vehicle 1, (1b) in a schematically illustrated vehicle-related arrangement in the form of control equipment 10 for controlling a contact member or a current remover or collector 4 associated with the vehicle 1, and to an electric contact with pairs of contact surfaces, as leads or strips, which may be placed under power or voltage and in the form of rails or strips 4a, 4b for the possible common driving in parallel of an electric motor 5 from the set of batteries "II", "B" and/or from the stationary station "III", "s1" and/or from the diesel generator "I", "G".

In this case current remover or collector 4 is related to a support 6 which may be displaced upwards and downwards vertically by means of a first electric auxiliary motor 7 and may be moved sideways back and forth by a second electric auxiliary motor 8.

The means and the control of auxiliary motors 7, 8, which are required for this movement with the assistance of sensors, are not shown in detail.

Both auxiliary motor 7 and auxiliary motor 8 may be activated in a movement directed forward and backward, wherein a first motion is activated over a first signal on a first conductor 7a and a first signal over a first conductor 8a, respectively, whereas a second (opposite) motion is activated by means of a second signal over conductors 7a and 8a, respectively, while the instantaneous setting positions of motors 7, 8 and support 6 are evaluated by one or more, not shown, sensors and are indicated by means of a generated signal on a second conductor or lead 7b and 8b, respectively.

These signals on the first conductors 7a, 8a are generated in a central unit or a power control circuit 100 having control equipment 10, and signals on the second conductor 7b and 8b are generated in the same central circuit 100 while utilizing position sensors (not shown).

Said power control circuit 100 with control equipment 10 is a complex unit, which i.a. over a sensor 16 is to be able to sense the existence of and the orientation of conductor surfaces, such as conductors or strips 4a, 4b, and thereafter lower the current remover or collector 4 by means of auxiliary motor 7 to electric contact with these two conductors 4a, 4b, which here are illustrated as being placed under voltage.

Over a connection 10a to power control circuit 100 and its control circuit "R2" the power and energy which over circuit "R1" distributes the energy sources, is supplied to motor 5, and is here controlled by throttle arrangement 100a. For this purpose circuit "R2" will have to be controlled directly by said throttle arrangement 100a (FIG. 1C) so as to supply motor 5 with the required power over the circuit "R1". In the illustrated position the current collector or remover 4 conducts current and voltage from power source "s1", "III" over to the power and energy distributing circuit "R1". The latter or a control circuit "R2" senses the power requirement of motor 5 over its central unit 100 and primarily feeds motor 5 with the power it needs, according to the input signal on the connection or conductor 10a, and generated output signal on the connection or conductor 10b so as thereby to load the stationary system "III", "s1" and supplement the power and energy requirements over battery setting "II", "B".

Connecting in parallel the power "III", "s1" taken out of the vehicle externally and the power "I", "G" and/or "II", "B" generated in the vehicle can here be carried out over circuits "R1" and control circuit "R2" and with the assistance of power control circuit 100.

Information about a desired speed and thereto related power of vehicle 1 is supplied to power central circuit 100 over conductor 10a, and circuit "R1" is affected over conductor 10b via internal circuits, which are not shown, and the function of the control circuit "R2" and control equipment 10.

FIG. 3 shows an end view of a vehicle 1, (1b) with its downwardly directed current collector or remover 4 in mechanical and electrical cooperation with the two live contact surfaces, as conductors, rails or strips 4a, 4b associated with road portion 2a1' and a connection 4c to ground.

FIG. 4 shows an electric switching arrangement "K1", in which roadway section or portion after roadway section or portion 2a1, 2a2, 2a3 and 2a1', 2a2' and 2a3', respectively, with their station or stations "s1", "s2", "s3" and "s1'", s2'" and "s3'", respectively, can be activated and made to conduct power as voltage from one and the same controlled power source "III", 42 over switching means and switches 43a, 44a, and 45a for one stretch of a roadway 2a and 43a', 44a' and 45a' along the opposite stretch of a roadway 2b, depending on whether a vehicle 1, 1b will pass along the electrically separate but with longitudinal tracks or grooves coordinated roadway 2a, 2b sections or portions.

For this a number of switches or connecting means for connecting and disconnecting stations "s1", "s2" . . . will be needed, wherein this connecting and disconnecting can occur over stationary sensors (not shown) related to the section or portion of the roadway.

The present invention is based on the prerequisites mentioned above and indicates in accordance with FIG. 5 that a current collector 41 and 41', respectively, or a snow plough arrangement 41, 141, 241 is adapted to run freely along the tracks 51a, 51, 52, respectively, allotted to a stretch of roadway 2a1.

In accordance with FIG. 7 the current collector 41, 41' is structured by a main portion 141, 141' which is formed of electrically insulating material and whose lower surface 142, 142' facing conductor surface 4a', which can be subjected to voltage, is shaped flat or at least essentially flat with a within said lower surface 142, 142' shaped, of an electrically conductive material 143, 143' consisting lower contact surface 144, 149a, 149 and the electrically conductive surface is adapted to extend through the main portion 141, 141' so as to form one or more upper contact surfaces 146, 146a or connecting means to the upper surface 145, 145' of the main portion.

The main portion 141, 141' is allotted a surface extension along a track 51 with a thickness similar to but slightly lesser than the width of the track 51 having the form of a parallelogram or a parallelepiped or having a form similar to these.

The upper 145, 145' and lower surfaces 142, 142' of the parallelepiped or main portion 141, 141' are adapted to be parallel to each other.

Two or more current conductors 41 and 41' are, along extension of track 51, coordinated with one and the same conductor surface 4a', which may be subjected to voltage, and apart from that adapted to form circuits connected in parallel.

FIG. 7 illustrates that a first main portion 41 is allotted a parallelepipedic form which deviates from the parallelepipedic form of a second main portion 41'.

Two or more lower contact surfaces designated 149a, 149 are allotted to said lower surface 142' of a portion 41'.

A resilient or spring member 150 and 150', respectively, is adapted to urge the current collectors 41, 41' and also its snow plough arrangement 241 and its main portion 141 as well as its lower contact surface 144 or lower contact surfaces 149, 149a against the conductor surface 4a' which can be subjected to voltage, at the bottom of the track.

Two or more current collectors 41, 41' and 42, 42', respectively, are disposed in parallel and allotted individual ones or two or more parallel tracks 51, 52 according to FIG. 5.

Current collectors 41, 41'; 42, 42' are at least with their lower contact surfaces 144, 149, 149a, formed of steel, stainless steel, copper, brass, bronze, aluminum and/or hard coals.

Each current collector 41, 41' is allotted at least one lower contact surface 144, 149a, 149 and the latter is shaped as a brush unit, consisting of steel, stainless steel, copper, brass, bronze, aluminum and/or hard coals.

Conductor surface 4a', which may be subjected to voltage, is made of steel, stainless, steel, copper, brass, bronze, aluminum and/or hard coals.

The lower contact surface 144, 149a, 149 is adapted to urge against said conductor surface 4a', which may be subjected to voltage, or the bottom of a track with the force of between 1 and 15, such as between 2 and 4, as a suggestion around 3 N/cm$^2$ against said conductor 4a' which may be subjected to voltage at the bottom of the track.

Said two or more conductor surfaces 144, 1491, 149, which may be subjected to voltage, such as contact surface 4a', are coordinated at the bottom of the respective tracks 51, 52 in a canalization 30 according to FIG. 6A and FIG. 6B.

Said conductor surfaces 4a', 4b', which can be subjected to voltage, are shaped as rails or bands having an upper broad contact surface and having a limited thickness.

Canalization 30 is as a unit extended and shaped elastically so that it can be bent to a roll.

FIG. 6A shows a cross section of a canalization 3d with two conductors 4a', 4b', which may be subjected to electric voltage, and disposed in individual tracks 51, 52 in canalization 30 as well as a third track 51a for protecting the conductors against collection of water, said third track 51a being able to cooperate with a yieldable means cleansing the track of loose obstacles and of solid obstacles, and FIG. 6B shows in a cross section an alternative.

FIG. 7 illustrates the structure of two after each other in a normal and chosen direction of travel of the vehicle disposed current collectors along a track.

FIG. 8 shows in two positions, different in time, a snow plough arrangement 241 in the form of a current collector in the function of a yieldable means caused by solid obstacles in the track when said means engages a solid obstacle 81 and when this means has rotated around its axis of rotation to a position where it is possible to pass the obstacle 81.

This means 80 cleansing from loose and/or solid obstacles 81, such as snow, ice, water, sand, gravel and the like, is within its upper portion 145 supported rotatably over a horizontally disposed axis of rotation 82.

The cleansing means 80, 241 and said axis of rotation 82 are movably secured in vertical direction towards and away from chassis allotted to the vehicle, by means of a resilient member 150, and said means has an edge portion 83 disposed in the direction of travel shaped with a forwardly directed edge portion 83. Said edge portion 83 being allotted a pointed area 83a, which may be connected to the track 51 and its conductor 4a or the bottom of the track.

A surface portion 142a of the lower surface 142 is bent upwards slightly in order to ease the pressure against conductor surface 4a' or the bottom of the track.

The angular value "a" of pointed portion 83a is chosen to fall within the angular field of 30° to 60°, such as around 45°.

The resilient member 150, 150' or its attachment or point of action along surface 145, 145' is dimensioned for a limited vertical pressure against conductor surface 4a or the bottom of the track.

Said edge portion 83 is allotted an angular value with regard to track 51 for by means of its speed along the track throwing loose obstacles 81 in a direction upwards and in a direction away from track 51. Edge portion 83a can be allotted a shape of one or two propeller surfaces.

Its lower flat surface area 142 is somewhat bent at 142a upwards from the track 51 in connection with its pointed portion 83a.

The shape of snow plough arrangement 241 and the cleansing means 80 is adapted to correspond to the shape of a current collector 41 and can thus consist of such current collector in accordance with FIG. 8.

Nothing prevents the cleansing means 80 of consisting of a unit disposed before a current collector 41, not shown in FIG. 5.

The snow plough arrangement 241 is here illustrated cooperating with the chassis of vehicle 1 over a control circuit shown in FIG. 2.

However, the snow plough arrangement 241 could be related to a snow plough chassis and disposed in the direction of the snow plough blade. The control circuit of FIG. 2 can then be allotted to the chassis of the snow plough.

With renewed reference to FIGS. 6A and 6B, FIG. 6A illustrates that at least three tracks or gaps 51a, 51, 52 are disposed parallel to each other in a common rail structure 30, where at least two of these tracks or gaps 51; 52 are adapted to carry and enclose individual rails or conductor surfaces 4a', 4b', which may be subjected to voltage, where in any case one track or gap 51a is disposed closer to the highest point 501 of the roadway 500 than the other ones and adjacent to a track 51 or a gap for one of said conductor surfaces, which may be subjected to voltage, shaped as rails 4a, 4b.

Said rails or gaps 51a, 51, 52 are disposed in a chosen middle area of the lane division of a road.

The upper open portions of the tracks or gaps 51a, 51, 52 are adapted to engage the upper slanting surface 500c of the roadway.

The tracks or gaps 51a, 52, 52 with said conductor surfaces 4a', 4b', which may be subjected to voltage, are shaped as an elongated rail 4a, 4b disposed in a channel in roadway 500c, with said channel being dimensioned as a track or channel for conducting surface water below and past rails 51, 52 with their upwardly facing tracks or gaps.

FIG. 6A illustrates that one edge portion 500e of the channel, facing the highest point 501 of the roadway, is disposed at a higher level than an upper edge portion of an adjacently disposed first track 51 with its first conductor surface 4a', being subjected to voltage, whereas the other edge portion 500f of the channel, facing the edge of the roadway, is disposed at a lower level than an upper edge portion of an adjacent second track 52 with its second conductor surface 4b', being subjected to voltage.

FIG. 6A illustrates that the upper portion of the first track 51 is angled in the direction of the roadway and its edge portion 500e and is adapted to connect to a virtual portion of roadway 500g, extending between one edge portion of the channel and its other edge portion 500f.

FIG. 6B illustrates that three different tracks or gaps 51a, 51, 52 are disposed in roadway 500 with two tracks adapted to carry and enclose individual rails and their surfaces 4a', 4b' which may be subjected to voltage, and having a track or gap 51a disposed adjacent to said two tracks and facing the highest point 501 of the roadway.

It can be appropriate to dimension the snow plough arrangement stronger in an application for a truck rather than as an application kit as a snow plough.

The invention is of course not limited to the embodiment disclosed above as an example, and it can be subjected to modifications within the frame of the inventive concept illustrated in the following claims.

It should be particularly noted that each shown unit and/or circuit can be combined with each other illustrated unit and/or circuit within the frame of being able to reach the desired technical function.

Some of the following reference numerals have been introduced into FIGS. 1 to 4;

a. 1. Vehicle illustrated as a Ford Model A.
b. 1*b*. Truck
c. 1*c*. Trailer to truck "b".
d. 2. Stretch of a roadway
e. 2*a*. Roadway in one traveling direction
f. 2*b*. Roadway in an opposite traveling direction
g. 2*a*1. Roadway section in one traveling direction
h. 2*a*1'. Roadway section in an opposite direction
i. 3. Steering equipment
j. 4. Vehicle related contact means as current remover
k. 4*a*. Electrical conductive first rail
l. 4*b*. Electrical conductive second rail
m. 4*c*. Roadway section related electrical conductor
n. 4*a'*. Electrical conductive first surface
o. 4*b'*. Electrical conductive second surface
p. 5. Vehicle related DC-motor
q. 6. Support for vehicle related contact means (j)
r. 7, 8. Auxiliary motors
s. 10. Control equipment for contact means (j)
t. 30. Canalization for electric conductors (k, l, m.) and including grooves (u, v.)
u. 51. First roadway section related groove
v. 52. Second roadway section related groove
w. 100. Power control circuit
x. "I". First vehicle related power source (Generator)
y. "II". Second vehicle related power source (Battery set.)
z. "III". Third power source, vehicle external (Ground Station)
aa. "F". Driver (not shown.)
bb. "R1". Energy distributing and three power sources controlling circuit
cc. "R2". Control circuit for energy distribution (Speed control)
dd. "S". Vehicle and roadways related system

The invention claimed is:

1. A vehicle-related snow plough arrangement comprising at least one snow plough unit and related to an arrangement or system for propelling an electrically propellable vehicle, by one or several batteries or a set of batteries, along a roadway comprising a plurality of roadway sections, the system comprising:

"a" a plurality of roadway portions for subdividing the roadway into said roadway sections, wherein each one of the road sections comprises one or more elongated tracks or slits having conductors introduced therein adapted to be supplied with current and put under voltage, and being connectable via a switch to one or more vehicle-external power sources, including vehicle-external electric stations, for thereby enabling a charging of said set of batteries belonging to the vehicle but primarily driving the vehicle along the roadway and the roadway sections, and "b" one or more driveable or propellable vehicles which may be driven by means of an electric motor or motors, with each of the respective vehicles comprising a control circuit adapted for necessary distribution of power, adapted for creating a required power and/or speed control, wherein said vehicle is provided on the underneath side with contact means displaceable up and down and sideways, in relation to the direction of transportation of the vehicle, wherein said elongated track or tracks and the conductors extend along the roadway and the roadway sections and wherein said contact means is coordinated with a vehicle-related control equipment for creating an adaptation of the contact means so as to at least offer a mechanical and electrical contact with said conductors, wherein coordination between the conductors put under voltage belonging to the roadway section and the contact means of the vehicle occurs via coordinated current collectors, in the form of contact springs adapted for mechanical and electrical cooperation with respective ones of the conductors, wherein the snow plough unit is designed as a cleaning means, adapted to clear the track from loose obstacles, such as ice, snow, water, sand, gravel, and yield to solid obstacles, wherein the snow plough unit is adapted to be rotatably attached to the contact means in an upper area about a horizontally disposed axis of rotation, wherein the snow plough unit and said axis of rotation are movably disposed in a vertical direction by means of a resilient member, and wherein the snow plough unit is oriented in the direction of transportation of the vehicle and comprises a forwardly directed edge portion, said edge portion comprising a point, which may be brought into contact with the bottom of the track and/or the conductor.

2. Snow plough arrangement in accordance with claim 1, wherein angle of the edge portion with regard to the track is within range 30° to 60°, preferably such as around 45°.

3. Snow plough arrangement in accordance with claim 1, wherein the resilient member is dimensioned for forming a limited vertical force against the bottom of the track and/or the conductor.

4. Snow plough arrangement in accordance with claim 1, wherein the angle of said edge point or portion with regard to the track is adapted to enable the snow plough unit to throw snow, ice, water and/or other obstacles in a direction upwards and away from the track due to the speed along the track.

5. Snow plough arrangement in accordance with claim 1, wherein a lower flat surface area of the snow plough unit is somewhat curved upwardly from the track beginning from the point.

6. Snow plough arrangement in accordance with claim 1, wherein the snow plough unit has a shape corresponding to a current collector.

7. Snow plough arrangement in accordance with claim 1, wherein the snow plough unit is adapted to run freely along the track disposed in the direction of the roadway.

8. Snow plough arrangement in accordance with claim 1, wherein the snow plough unit further comprises a main portion substantially having the shape of a parallelogram or a parallelepiped with a surface area spread out along the track and a thickness corresponding to the width of the track.

9. Snow plough arrangement in accordance with claim 8, wherein the lower and upper surfaces of the parallelepiped are mutually parallel.

10. Snow plough arrangement in accordance with claim 8, comprising two or more snow plough units, adapted to be brought into contact with one and the same track.

11. Snow plough arrangement in accordance with claim 10, wherein a main portion of the first snow plough unit has the shape of a parallelepiped which differs from a parallelepiped shape of a main portion of the second snow plough unit.

12. Snow plough arrangement in accordance with claim 8, wherein the resilient member is adapted to urge the snow plough unit and the main portion against the bottom of the track.

13. Snow plough arrangement in accordance with claim 1, comprising two or more snow plough units oriented in parallel and each adapted to run in one of two or more parallel tracks.

14. Snow plough arrangement in accordance with claim 1, wherein the snow plough unit is adapted to push against the bottom of the track with a force of between 1 and 15 N/cm$^2$.

* * * * *